(12) United States Patent
Gryglewski et al.

(10) Patent No.: US 10,890,943 B2
(45) Date of Patent: Jan. 12, 2021

(54) HOLDING DEVICE FOR A HANDHELD COMPUTER UNIT FOR CONTROLLING A MACHINE

(71) Applicant: Robert Bosch GmbH, Stuttgart (DE)

(72) Inventors: Andreas Gryglewski, Lohr (DE); Dominik Hammer, Guentersleben (DE); Guenther Seufert, Oerlenbach (DE); Oliver Scheb, Lohr am Main (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/440,180

(22) Filed: Jun. 13, 2019

(65) Prior Publication Data

US 2019/0384359 A1 Dec. 19, 2019

(30) Foreign Application Priority Data

Jun. 19, 2018 (DE) ........................ 10 2018 209 888

(51) Int. Cl.
*G06F 1/16* (2006.01)
*B23Q 11/00* (2006.01)
*G05B 19/10* (2006.01)
*F16B 2/12* (2006.01)

(52) U.S. Cl.
CPC ........ *G06F 1/1632* (2013.01); *B23Q 11/0092* (2013.01); *F16B 2/12* (2013.01); *G05B 19/106* (2013.01); *G05B 2219/24003* (2013.01)

(58) Field of Classification Search
None
See application file for complete search history.

(56) References Cited

U.S. PATENT DOCUMENTS

| | | | |
|---|---|---|---|
| 8,240,628 B2 * | 8/2012 | Huang | F16M 11/041 248/122.1 |
| 9,695,977 B2 * | 7/2017 | Blalock | F16M 13/022 |
| 9,749,002 B1 * | 8/2017 | Fan | H04M 1/04 |
| 10,172,246 B2 * | 1/2019 | Apter | F16B 2/12 |
| 2014/0263931 A1 * | 9/2014 | Chen | F16M 13/00 248/576 |

* cited by examiner

*Primary Examiner* — K. Wong
(74) *Attorney, Agent, or Firm* — Maginot, Moore & Beck LLP

(57) ABSTRACT

The disclosure relates to a holding device for a handheld computer unit that is designed to control a machine, wherein the holding device has a holding unit that is designed to hold the handheld computer unit, and wherein at least one integrated safety switch for a safety function of the machine is integrated into the holding device and/or wherein the holding device has a further holding unit for holding at least one external safety switch for a safety function of the machine.

12 Claims, 3 Drawing Sheets

HOLDING DEVICE FOR A HANDHELD
COMPUTER UNIT FOR CONTROLLING A
MACHINE

This application claims priority under 35 U.S.C. § 119 to application no. DE 10 2018 209 888.3, filed on Jun. 19, 2018 in Germany, the disclosure of which is incorporated herein by reference in its entirety.

TECHNICAL FIELD

The present disclosure relates to a holding device for a handheld computer unit that is designed to control a machine.

BACKGROUND

In order to implement visualization and operating tasks on machines, usually stationary and mobile devices are available. These have safety switches for a safety function of the machine, which are required or may even be prescribed for safe operation of the machine. For example, an emergency stop switch or an enabling switch are provided as such safety switches. For example, it may be necessary to actuate such an enabling switch in order to allow axes or robots to be moved manually.

SUMMARY

According to the disclosure, a holding device for a handheld computer unit that is designed to control a machine, having the features of the disclosure, is proposed. Advantageous configurations are the subject matter of the detailed embodiments and the following description.

The holding device has a holding unit that is designed to hold the handheld computer unit. By means of this holding unit, the handheld computer unit can expediently be attached or fastened flexibly to the holding device and also be removed or detached therefrom again. In particular, the holding device has a support element such as a frame, to which the holding unit is attached.

Furthermore, at least one integrated safety switch for a safety function of the machine is integrated into the holding device. In particular, this at least one integrated safety switch is integrated into the support element, or into the frame, expediently such that simultaneous operation of the handheld computer unit and of the integrated safety switch is possible.

Alternatively or additionally, the holding device has a further holding unit for holding at least one external safety switch for a safety function of the machine. An external safety switch should be understood in this connection as meaning in particular a safety switch that is not permanently integrated into the holding device, is connectable to the holding device and is removable from the latter again.

Analogously to the above explanation, by means of this further holding unit, the at least one external safety switch can expediently be attached to the holding device and detached from the latter again. This further holding unit is attached in particular to the support element, or the frame. Expediently, the at least one external safety switch is attachable to the holding device by the further holding unit such that simultaneous operation of the handheld computer unit and of the safety switch is possible.

Safety switches are required in particular for safe operation of the machine and may possibly be prescribed for safety reasons. In particular it may be necessary, for controlling the machine, for a corresponding safety function to be executed by such a safety switch. Preferably, the at least one integrated safety switch and/or the at least one external safety switch is an emergency stop switch and/or an enabling switch. For example, it may be necessary to actuate such an enabling switch in order to enable axes or robots of the machine to be moved in a manner controlled by the handheld computer unit.

The handheld computer unit is in the form of a portable handheld unit, expediently of a touchscreen handheld unit, for example of a smartphone or tablet computer. A software application, for example what is known as an "app", is run on the handheld computer unit, said application representing in particular a human-machine interface and making it possible to control the machine. In order to control the machine by means of the handheld computer unit, the software application run on the handheld computer unit can expediently communicate with a control device of the machine, or a machine control unit, and initiate the corresponding control via this communication. The control comprises in particular the output of commands to the machine control unit, for example SPS.

In particular, to control the machine, a control and visualization application can be provided, which can also be run as a web application. In this case, a server, which can be run for example on a computer unit in the machine, in particular on a control device, or in a remote computer unit that does not belong to the machine, provides the corresponding control and visualization application. This can be displayed in a web browser on the handheld computer unit. For example, for this purpose, a web browser can be used on the handheld computer unit, for instance an HTML5-enabled web browser such as Chrome, Firefox, Edge or Safari.

By means of such a web-based control and visualization application, additional degrees of freedom for the control hardware of machines are available and it is possible in particular to use conventional handheld computer units such as smartphones or tablet computers to control the machine, these being cost-effective and easy to acquire. Furthermore, these handheld computer units have a high level of acceptance among users and users are familiar with the operation of the handheld computer units.

Safety functions that are required or prescribed for safe operation of the machine conventionally cannot be implemented readily on handheld computer units. In particular, it is not readily possible to integrate safety switches such as emergency stop switches or enabling switches in handheld computer units. Such safety switches are characterized in that they are intended to transmit to the machine safety-related signals that may be prescribed for safety reasons for manual operation of the machine. For example, such safety switches can be used for the rapid and safe shutting down of machines in an emergency according to DIN EN ISO 13850 "Safety of machinery—Emergency stop function—Principles for design (ISO 13850:2015); German version EN ISO 13850:2015" and satisfy the requirements of machinery directive 2006/42/EC. The standards provide the requirement that machines and systems be equipped with one or more emergency stop control devices. These should allow the operator to shut down an unexpectedly occurring hazardous machine function as quickly as possible.

The present holding device now provides a possibility of remedying these drawbacks and of allowing ergonomically easy control of machines by means of handheld computer units. For this purpose, the handheld computer unit and at least one integrated or external safety switch are held in a holding device. The holding device thus allows simultaneous operation both of the handheld computer unit and of the at least one safety switch in an uncomplicated and ergonomically favorable manner. The handheld computer unit can be used in the holding device in particular for machine visualization and, in combination with the safety switches, for control, in particular starting up and operating a machine.

The holding device thus represents a preferably mobile, portable module and a simple and stable connecting device, which allows rapid fitting and removal of the handheld computer unit. Furthermore, the holding device provides mechanical protection in order to reduce damage to the handheld computer unit if it falls from a low height or if it is acted on by an external force.

According to a particularly preferred configuration, the holding device also has a communications interface that is designed to establish a data-transmitting communications link between the machine (or a machine control unit) for the one part and the at least one integrated safety switch and/or the at least one external safety switch and/or the handheld computer unit for the other part. Via this communications interface, a communication, secured by means of an expedient security protocol, between the machine for the one part and the safety switches or the handheld computer unit for the other part is in particular allowed and signals can be transmitted from the holding device securely to the machine.

Advantageously, it is also conceivable for only one data-transmitting communications link to be able to be established between the machine control unit for the one part and the at least one integrated safety switch and/or the at least one external safety switch for the other part via the communications interface. In this case, the handheld computer unit is expediently connectable to the machine in a data-transmitting manner in some other way, in particular via a web application and thus expediently via the Internet or intranet.

Preferably, the at least one safety switch and/or the handheld computer unit can be connected to a bus or fieldbus system of the machine, in particular a Sercos, Profibus, Profinet fieldbus system, for example Sercos 2, Sercos III, EtherCAT, Profinet IRT, Profinet RT, Ethernet/IP, via the communications interface.

Advantageously, the communications interface is wired. In particular, the holding device has a detachable interface, for example a jack. Alternatively, the cable can also be permanently connected to the holding device. Internal safety switches can in particular be permanently wired to the communications interface. External safety switches and/or the handheld computer unit can be connected to the machine via separate communications interfaces.

Alternatively or additionally, the communications interface can be wireless, for example WLAN or Wi-Fi, Bluetooth, Ultra Wide Band (UWB) or a mobile communications system such as 4G, 5G etc. External safety switches and/or the handheld computer unit can expediently be automatically detected and connected to the wireless communications interface when they are brought into the vicinity or into the range of the holding device (for example by means of what is known as near field communication).

A combination of wired and wireless communications interfaces is in particular also possible. For example, the handheld computer unit and/or the external safety switches can be attached wirelessly, whereas integrated safety switches are wired.

Advantageously, the holding device also has at least one control element for controlling a function of the machine. In particular, this at least one control element is integrated, analogously to the integrated safety switch, into the support element, or the frame, of the holding device, expediently such that simultaneous operation of the handheld computer unit, of the safety switches and of the control elements is possible. For example such a control element can be in the form of a key, a joystick, a touchscreen, etc. For example, via the control elements, functions that are freely selectable by a user can be initiated in the machine.

Preferably, the communications interface is also designed to establish a data-transmitting communications link between the machine and the at least one control element. Via the communications interface, signals are expediently transmitted from the control elements to the machine, in particular via a bus or fieldbus system of the machine.

According to a preferred configuration, the holding unit is mechanically adjustable and preferably adaptable to the size of the handheld computer unit. In this way, in particular the use of different handheld computer units of different sizes can be allowed and it may be equally possible for example to use a smartphone or a tablet computer.

According to a particularly preferred configuration, the holding unit is a mechanically adjustable clamping mechanism or bracing mechanism for clamping the handheld computer unit in place. In particular, such a clamping mechanism has, for this purpose, at least two clamping elements, between which the handheld computer unit is able to be clamped in place. Expediently, the clamping mechanism is thus adaptable to the size of the handheld computer unit.

Advantageously, a mechanical adjusting wheel for adjusting the holding unit is provided. By means of this adjusting wheel, the holding unit can be adapted preferably to the size of the handheld computer unit, and rapid fitting and removal of the handheld computer unit can expediently be allowed. Expediently, the holding device can, as explained above, have a support element, on the front side of which in particular the holding unit is arranged and on the rear side of which expediently the adjusting wheel is arranged. In particular, the clamping mechanism, expediently the clamping elements of the clamping mechanism, can be adjusted by means of the adjusting wheel. For example, the clamping elements are in this case arranged on the front side of the support element and the adjusting wheel on the rear side.

Advantageously, the further holding unit has a rotatable ring element, in particular a freely rotatable ring, to which the at least one external safety switch is attachable. This ring element can expediently be arranged on the rear side of the support element. In particular, the ring element is arranged concentrically around the adjusting wheel.

By way of the rotatable ring element, the at least one external safety switch can be adjusted and oriented as desired, and use of the safety switch in any desired position can be allowed. Thus, the holding device can be used in particular equally by left-handed and right-handed people vertically, horizontally or at any other angle.

Preferably, a mechanical adjusting wheel for fixing the rotatable ring element in position is provided. Given a desired orientation of the external safety switch, the ring element can be locked to the holding device by means of this adjusting wheel.

Preferably, the at least one external safety switch is attachable to the ring element by at least one holding element, for example by means of a two-part fastening device, by which the external safety switch can be clamped in place and mounted on the ring element. Alternatively, it is also conceivable to attach the external safety switch directly to the ring element or directly to the holding device, for example by means of bores, into which the safety switch can be screwed.

The holding device can furthermore advantageously have one or more of the following elements: a radio unit, a data processing unit, a data storage unit, a localization unit, a voltage source and a sensor unit.

By means of such a radio unit, in particular a data-transmitting communications link between the handheld computer unit and the machine can be established. This can be implemented for example using the 5G mobile communications standard. Not only is a radio interface thus available, but also 5G supports the localization of the holding device. Other technologies, such as WLAN or WiFi, Bluetooth, other mobile communications systems such as 3G or 4G, Ultra Wide Band (UWB), etc. are also conceivable. Furthermore, the radio unit can expediently be used for a WLAN hotspot to which the handheld computer unit can be connected.

The localization unit serves expediently to localize the holding device and can be based for example on GPS, Ultra Wide Band (UWB), ultrasound, etc. Some communications technologies such as 5G already contain localization solutions, which can be used for the localization of the holding device. If this is not the case, for example, or if the accuracy is not sufficient for a particular purpose, for example, the localization of the holding device can take place with the aid of the integrated localization unit.

The voltage source can be provided in particular to power the handheld computer unit. For example, the voltage source can be provided as an integrated, exchangeable battery or rechargeable battery. In particular, the voltage source can be charged via contactless technology such as induction loops. Expediently, a display or message relating to the state of the voltage source can be provided on the holding device, such that an imminent failure can be detected early. In particular, a "Lifetick", as it is known, can be provided, such that the holding device checks in with a base station at predetermined intervals. If this check-in does not occur beyond a timeout time, the base station can output an error message with the last known position of the holding device. Thus, it is also possible to deal with suddenly failing voltage or defects of the holding device.

The sensor unit can comprise for example fingerprint scanners, RFID scanners or similar sensors for identifying the user. Acceleration sensors, temperature sensors, humidity sensors etc. can also be provided, for example in order to record falls and ambient conditions of the holding device.

The data storage unit can be provided for example to store sensor data from the sensor unit or access data for wireless networks or user data.

The data processing unit can be provided in particular to activate a local WLAN hotspot, via which the handheld computer unit can be connected to the machine. Furthermore, the data processing unit can prepare in particular data of the localization unit and of the sensor unit and control a wireless transmission to the base station.

The disclosure is suitable for a wide range of machines, for example for tunnel boring machines, machine tools, for example a welding system, screw system, wire saw, hydraulic punch/press or milling machine, or for a web processing machine, for example a printing machine, newspaper printing machine, gravure printing machine, screen printing machine, inline flexographic printing machine or packaging machine, or for a (conveyor) system for producing an automobile or for producing components of an automobile (for example internal combustion engines or control devices).

Further advantages and configurations of the disclosure will become apparent from the description and the accompanying drawing.

It goes without saying that the features mentioned above and those yet to be explained below are usable not only in the combination specified in each case but also in other combinations or on their own without departing from the scope of the present disclosure.

BRIEF DESCRIPTION OF THE DRAWINGS

The disclosure is schematically illustrated in the drawing on the basis of exemplary embodiments and described in detail in the following text with reference to the drawing.

In the drawings.

DETAILED DESCRIPTION

Figure 1A:
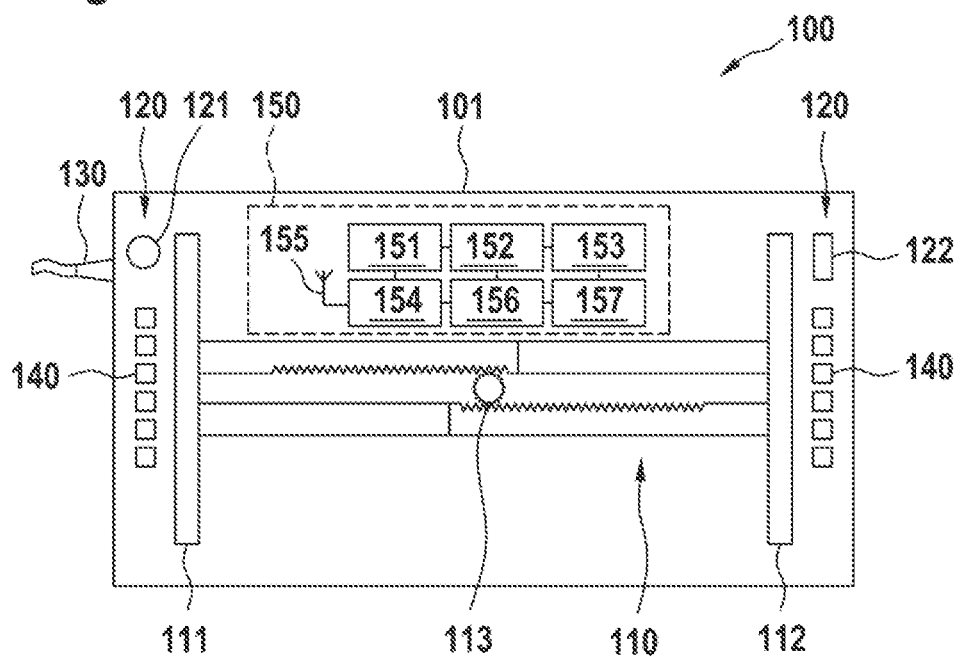
FIGS. 1a and 1b show a schematic front and rear view of a preferred configuration of a holding device according to the disclosure.
Figure 1B:
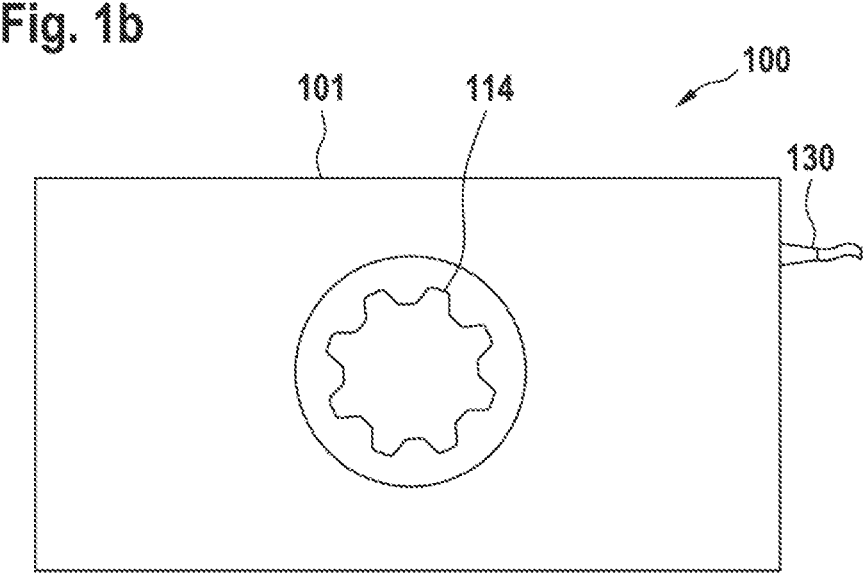

FIG. 1a schematically illustrates a front view of a preferred configuration of a holding device according to the disclosure, designated by 100. FIG. 1b shows the holding device 100 in a schematic rear view.

The holding device 100 has a support element 101, which can be formed for example as a frame or a plastics disk or plate.

Attached to the support element 101 is a holding unit 110, which is designed to hold a handheld computer unit. The handheld computer unit is in the form of a portable touchscreen handheld unit, for example of a smartphone or tablet computer, and is designed to control a machine, for example a machine tool. The control comprises in particular the output of commands to a machine control unit, for example SPS.

For controlling the machine, provision is made for example of a control and visualization application run as a web application, which is provided by a server that is run for example on the machine control unit or some other control device of the machine. This web application can be displayed in a web browser on the handheld computer unit.

The holding unit 110 is in the form of a mechanically adjustable clamping mechanism for clamping the handheld computer unit in place and can be adapted to the size of different handheld computer units. In the example shown, this clamping mechanism 110 comprises two T-shaped clamping elements 111, 112 that are arranged on the front side of the support element 101 and each have teeth that are engaged with a toothed wheel 113. The toothed wheel 113 is connected for conjoint rotation to an adjusting wheel 114 on the rear side of the support element 101. Thus, as a result of the adjusting wheel 114 being actuated, the clamping elements 111, 112 are moved toward or away from one another such that the handheld computer unit can be clamped in place therebetween.

Furthermore, at least one integrated safety switch 120 for a safety function of the machine is integrated into the holding device 100. These (in this case two) safety switches 120 are required in particular for safe operation of the machine and for the control of the machine by the handheld computer unit. For example, an emergency stop switch 121 and an enabling switch 122 are provided as safety switches 120 that are integrated permanently into the front side of the support element 101.

Safety switch means in particular that these are provided to transmit to the machine safety-related signals that may be prescribed for safety reasons for manual operation of the machine. For example, in this way, it is possible to work in the danger area of automated manufacturing systems during manual operation. Particular technical rules that are defined in the machinery directive and in various European standards (for example EN 60204, EN 12100, EN ISO 13849, EN 61062, etc.) apply to this type of operation.

The holding device 100 also has control elements 140 for controlling functions of the machine. Preferably, these functions are freely selectable by the user, for example by means of the abovementioned application. These control elements 140 are provided for example as keys and integrated permanently into the front side of the support element 101 analogously to the integrated safety switches 120. These control elements 140 differ from the safety switches in that they can be embodied either as safety switches for transmitting safety-related signals, like safety switches 120, or as normal switches.

The keys 140 and also the emergency stop switch 121 and the enabling switch 122 are arranged on the support element 101 such that simultaneous actuation of these elements 121, 122, 140 and of the handheld computer unit clamped in place in the clamping mechanism 110 is possible.

Furthermore, the holding device 100 has a communications interface 130, which is designed to establish a data-transmitting communications link between the machine, for example the machine control unit, for the one part, and the integrated safety switches 121 and 122 and the keys 140, for the other part. The communications interface 130 can for example be wired and provided for connection to a fieldbus system of the machine.

Furthermore, the holding device 100 has a module 150 integrated into the support element 101, said module 150 having for example a voltage source 151, a data processing unit 152, a sensor unit 153, a radio unit 154 with an antenna 155, a data storage unit 156, and a localization unit 157.

The antenna 155 is expediently integrated into the radio unit 154. By way of the radio unit 154, a WLAN hotspot can be established, to which the handheld computer unit can be connected. The handheld computer unit can in this way be incorporated in a network, for example an intranet and/or Internet, and access in particular services via the latter, for example a web server. The data processing unit 152 can be provided to activate a local WLAN hotspot.

The voltage source 151 is provided to power the handheld computer unit. The sensor unit 153 can be provided as a fingerprint scanner for identifying the user. The data storage unit 156 is provided to store user data. The localization unit 157 serves to localize the holding device 100 and can be based for example on GPS.

Figure 2A:
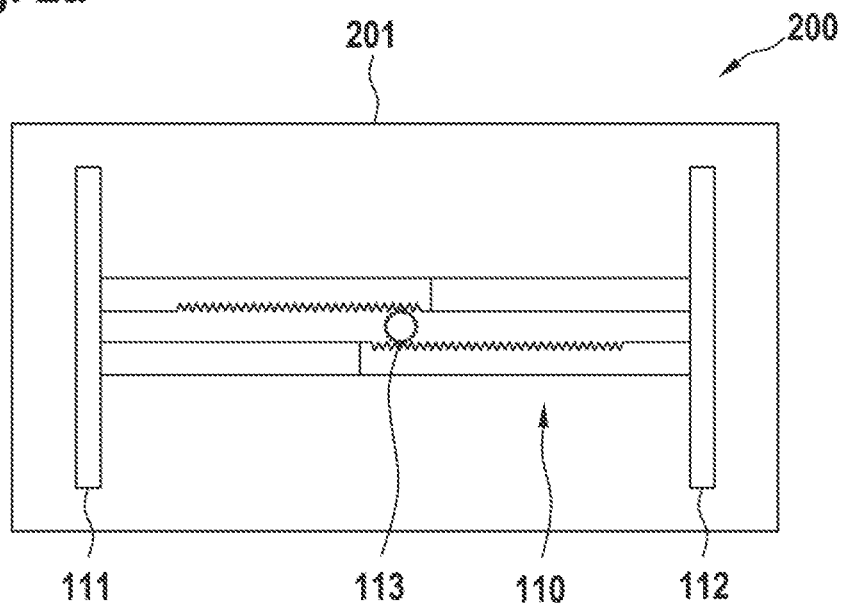
FIGS. 2a and 2b show a schematic front and rear view of a preferred configuration of a holding device according to the disclosure.
Figure 2B:
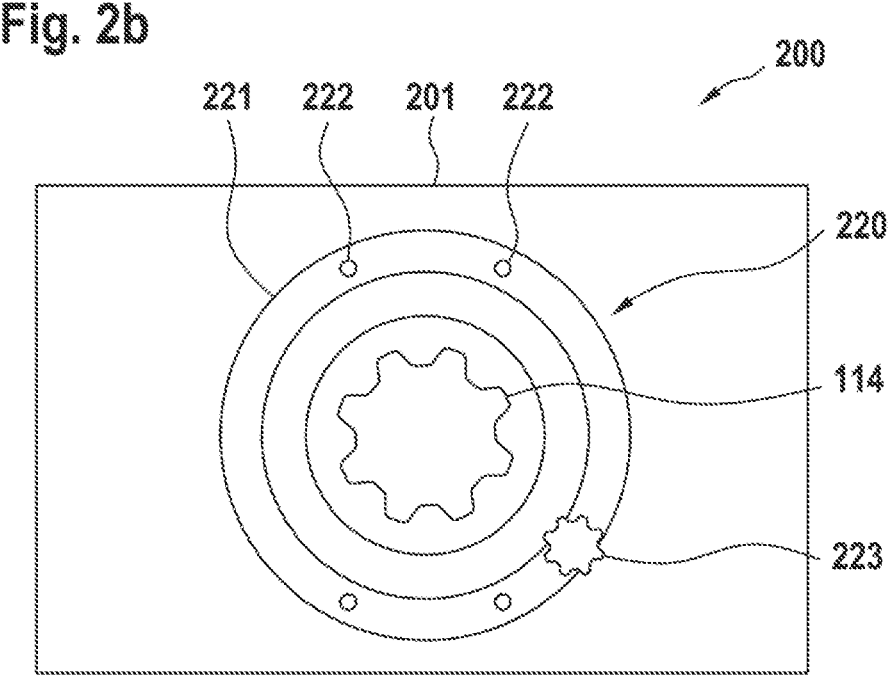

FIG. 2a illustrates a schematic front view of a further preferred configuration of a holding device according to the disclosure, designated by 200. FIG. 2b shows the holding device 200 in a schematic rear view. Identical reference signs in the figures denote identical or equivalent elements.

Analogously to the holding device 100 in FIGS. 1a and 1b, the holding device 200 shown in FIGS. 2a and 2b also has a support element 201, on which a holding unit 110, in the form of a clamping mechanism, for holding the handheld computer unit is provided.

No safety switches and no control elements are integrated in this example into the support element 201. In this example, the holding device 200 has, on its rear side, a further holding unit 220 for holding at least one external safety switch, for example an external emergency stop switch and an external enabling switch.

This further holding unit 220 comprises a freely rotatable ring element 221, which is arranged on the rear side of the support element 201, concentrically with the adjusting wheel 114. The ring element 221 has bores 222 at which external safety switches can be screwed in. Furthermore, a further adjusting wheel 223, by means of which the ring element 221 can be fixed, can be screwed into such a bore 222.

Figure 3:
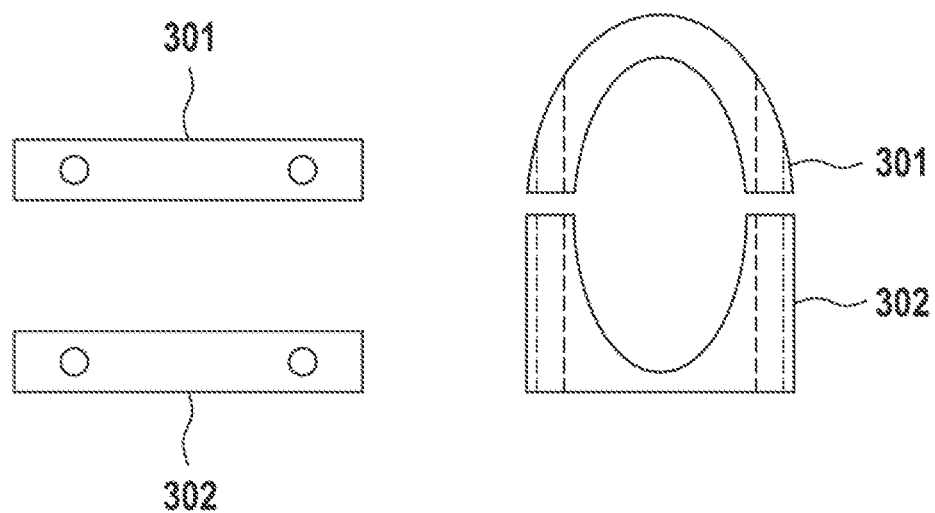
FIG. 3 schematically shows part of a preferred configuration of a holding device according to the disclosure.

For example, external safety switches can also be attached to the ring element 221 by means of suitable holding elements. FIG. 3 schematically illustrates one such two-part holding element comprising the parts 301 and 302 according to a preferred configuration of the disclosure from below (left) and from the front (right).

For example, clamping elements 301, 302 can be provided, which surround a round or oval opening into which an external safety switch can be clamped. By means of screws, the clamping elements 301, 302 and thus the external safety switch clamped therein can be fastened to two of the bores 222 of the ring element 221.

What is claimed is:

1. A holding device for a handheld computer configured to control a machine, the holding device comprising:
   a support element;
   a holder moveable relative to the support element and configured to hold the handheld computer; and
   at least one integrated safety switch integrated into the support element and configured to control a safety function of the machine.

2. The holding device according to claim 1, further comprising:
   a communications interface mounted on the support element and configured to establish a data-transmitting communications link between the machine and at least one of (i) the at least one integrated safety switch, and (ii) the handheld computer.

3. The holding device according to claim 2, wherein the communications interface is at least one of a wired communications interface and a wireless communications interface.

4. The holding device according to claim 1, further comprising:
   at least one control element configured to control a function of the machine, the at least one control element mounted on the support element.

5. The holding device according to claim 3, wherein the communications interface is configured to establish a data-transmitting communications link between the machine and at least one control element configured to control a function of the machine.

6. The holding device according to claim 1, wherein the holder is configured to mechanically adjust and adapt to a size of the handheld computer.

7. The holding device according to claim 1, the holder comprising:
   a mechanically adjustable clamping mechanism configured to clamp the handheld computer in place.

8. The holding device according to claim 1 further comprising:
a mechanical adjusting wheel configured to adjust the holder.

9. The holding device according to claim 1 further comprising as least one of:
a radio;
a data processor;
a data storage device;
a localization device;
a voltage source; and
a sensor.

10. The holding device according to claim 1, wherein the at least one integrated safety switch is at least one of an emergency stop switch and an enabling switch.

11. A holding device for a handheld computer configured to control a machine, the holding device comprising:
a support element;
a holder moveable relative to the support element and configured to hold the handheld computer;
a rotatable ring element mounted on the support element and configured for rotation relative to the support element; and
at least one external safety switch of the machine, the at least one external safety switch attached to the rotatable ring element,
wherein the at least one external safety switch is configured to control a safety function of the machine.

12. The holding device according to claim 11 further comprising:
a mechanical adjusting wheel mounted on the rotatable ring element and configured to fix the rotatable ring element in position relative to the support element.

* * * * *